April 13, 1954 WEN YUAN PAN 2,675,432

REGENERATIVE FEEDBACK CIRCUIT

Filed April 4, 1950

Inventor

WEN YUAN PAN

By H. W. Newton

Attorney

Patented Apr. 13, 1954

2,675,432

UNITED STATES PATENT OFFICE 2,675,432

REGENERATIVE FEEDBACK CIRCUIT

Wen Yuan Pan, Collingswood, N. J., assignor to Radio Corporation of America, a corporation of Delaware Application April 4, 1950, Serial No. 153,783

3 Claims. (Cl. 179—171)

This invention relates generally to band-pass signal amplifiers. More particularly this invention relates to resonant-coupled signal amplifiers utilizing frequency selective regenerative feedback means to provide improved selectivity.

A circuit embodying the invention is intended to be incorporated in the intermediate frequency signal amplifier of a superheterodyne receiving system to provide the desired symmetrical selectivity characteristic without the necessity of a plurality of tuned resonant circuits.

In receiving systems designed to receive amplitude modulated broadcast signals it has been customary to utilize intermediate frequency signal amplifier stages designed to be responsive to an intermediate frequency of 455 kilocycles or less. With the advent of signal transmission at frequencies of 7 megacycles or more, it was discovered that due to the relatively flat selectivity characteristic of conventional radio frequency tuned circuits, the image rejection ratio provided by receiving systems designed to utilize the normal 455 kilocycles intermediate frequency was extremely poor.

An improved image rejection ratio can be obtained by utilizing an intermediate frequency in the order of 2,000 kilocycles. However, the broad response characteristic of conventional tuned circuits at such a frequency gives rise to interference by relatively strong adjacent channel signals. This can be overcome by incorporating a plurality of tuned resonant circuits in the receiving system. This solution, however, is an expensive one, and therefore is not generally applicable in low cost receiving systems.

One system which has been proposed to provide selective amplification is described in U. S. Patent No. 2,280,605, to W. Van B. Roberts, issued April 21, 1942, for Piezoelectric Crystal Filter Circuit. The system referred to therein uses a cathode impedance comprising a parallel resonant circuit, a crystal, and a resistor in parallel relationship. The effect of such a composite cathode impedance is to provide greater amplification in a very narrow band of frequencies, including the intermediate frequency. However, there is no provision for a balancing network to compensate for the non-symmetrical response thus produced.

Another solution to this problem that has been proposed in the past is the use of a symmetrical double-crystal filter circuit connected serially in the signal receiving system. This circuit, however, requires delicate balancing of the circuit components in order to provide a symmetrical response characteristic.

It has also been proposed to utilize degenerative feedback through parallel resonant tuned circuits to the screen grid of a pentode amplifier tube. A system of this type is shown in the U. S. Patent No. 2,243,401, to K. R. Sturley, issued May 27, 1941, for Selectivity Control Circuits. Briefly the operation is as follows: by means of degenerative feedback, the gain of the amplifier stage is reduced when the signal in the output circuit of the amplifier stage is not of the same frequency as the resonant frequency of the parallel resonant feedback circuit. Here again, the selectivity characteristic of such a system is determined primarily by the selectivity characteristic obtainable with conventional tuned circuits.

It is, therefore, proposed to provide a resistance coupled degenerative signal amplifier having a highly selective piezoelectric device in a regenerative feedback circuit, thereby providing a selectivity characteristic suitable for use as an intermediate frequency amplifier.

It is an object of this invention to provide an improved band-pass signal amplifier having substantially a symmetrical and relatively sharp selectivity characteristic.

It is a further object of this invention to provide an improved resistance-coupled signal amplifier having a sharp band-pass frequency response characteristic suitable for use as an intermediate frequency amplifier.

It is a still further object of this invention to provide an improved intermediate frequency amplifier having a selectivity characteristic such as to enable substantially noise free stand-by operation.

In accordance with the present invention, there is provided a band-pass signal amplifier having an output circuit and a fixed resonant input circuit tuned to a predetermined intermediate frequency. There is further provided a feedback circuit comprising a piezoelectric device connected between the output circuit and the input circuit.

A further understanding of the invention may be had by reference to the following description when read in connection with the accompanying drawing, in which like reference numerals are used for like parts throughout, and the scope of the invention is pointed out in the appended claims.

Figure 1:
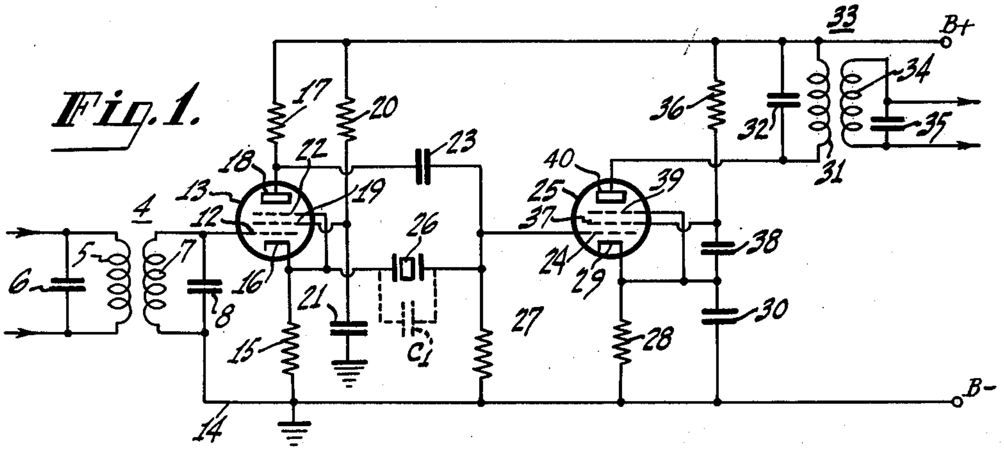
Figure 1 is a schematic circuit diagram of a feedback amplifier for a superheterodyne receiving systems and the like, embodying the invention.

Referring now to Figure 1, there is provided an input transformer 4, which may be an intermediate frequency transformer of standard design. The primary circuit of the intermediate frequency transformer 4 includes the primary winding 5 and capacitor 6 which form a parallel resonant circuit tuned to the desired intermediate frequency. The intermediate frequency may be 455 kilocycles, which at present is standard, or as above described it may be desirable to utilize an intermediate frequency in the order of 2000 kilocycles. The signal source to which the primary circuit is connected may be a conventional mixer or first detector stage of a superheterodyne receiving system.

Coupled with the primary circuit is the secondary circuit of transformer 4 including the secondary winding 7 and a capacitor 8 which form a second parallel resonant circuit tuned to substantially the same resonant frequency as the primary circuit. It is, of course, to be understood that the primary and secondary tuned circuits of the transformer 4 may be adjustable by means of a variable capacitor or by core tuning, but inasmuch as this forms no part of the present invention the circuits have been illustrated as having fixed components.

One side of the secondary winding 7 and capacitor 8 is connected to the control grid 12 of electron tube 13. The other side of the secondary circuit is connected to a common conductor 14 to which is also connected the negative terminal B— of a source of direct-current energizing potential, not shown. Conductor 14 may or may not be grounded but for the purpose of this description will be hereinafter referred to as ground.

In order to complete the input circuit of the electron tube 13, a cathode resistor 15 is connected between the cathode 16 of electron tube 13 and ground. A direct-current bias potential is developed across the cathode resistor 15 due to the normal flow of direct-current through electron tube 13. This bias potential is applied between the cathode 16 and the grid 12 of electron tube 13 to determine the operating point of electron tube 13, as is well known.

When a signal frequency voltage is developed in the secondary resonant circuit it will be applied between the grid 12 and ground. Since the cathode resistor 15 may have a resistance in the order of 3,300 ohms and since the cathode resistor is unbypassed and since the amplified plate current must flow through this cathode resistor, a voltage drop is produced that causes an additional voltage to be applied between grid and cathode.

$$\frac{\text{Actual output voltage}}{\text{Output voltage with zero cathode resistance}}=\frac{1}{1+gmR15} \quad (1)$$

where gm is the transconductance of the tube 13.

The utilization of the principle expressed in Equation 1 above covering cathode impedance degeneration will be explained in more detail in connection with a discussion of the circuit and response characteristic shown in the remaining figures of the drawing.

An anode load or output resistor 17 is connected between the anode 18 and the positive terminal B+ of source of direct-current energizing potential thereby completing the direct-current cathode-anode path of the electron tube 13. It is, of course, to be understood that the source of direct-current energizing potential is of such a character as to provide a minimum of signal impedance hence, the positive terminal B+ is assumed to be at ground potential for signal frequencies.

The necessary energizing potential for the screen grid 19 of electron tube 13 is provided from the positive terminal B+ through the screen dropping resistor 20 connected between the screen grid 19 and the positive terminal B+. Screen grid 19 is maintained at substantially zero signal potential by bypass capacitor 21, which is connected between the screen grid 19 and ground.

As is generally done with pentode tubes of this type, the suppressor grid 22 is connected directly to the cathode 16 thereby maintaining the suppressor grid 22 at the cathode potential.

An output coupling capacitor 23 is connected between the anode 18 of electron tube 13 and the control grid 24 of another electron tube 25. Electron tube 25 is illustrated as a second intermediate frequency amplifier but if desired, electron tube 25 could be the second detector stage of a superheterodyne receiver.

Selective, regenerative feedback from the output circuit to the input circuit of electron tube 13 is provided through the piezo electric device or crystal 26 illustrated in accordance with the present invention. As is well known in the art, a crystal can be considered as a high Q series resonant circuit exhibiting a low impedance at its series resonant frequency. There is, therefore, provided by crystal 26 a highly selective feedback path at the series resonant frequency of the crystal as will be discussed more fully in the subsequent description. It is presently noted that the feedback voltage selected by the crystal filter is applied to the cathode 16 of electron tube 13 to overcome the degenerative effect of the cathode resistor 15 at the particular series resonant frequency of the crystal.

The input circuit of electron tube 25 is completed by the grid resistor 27 connected between the control grid 24 and ground. A cathode resistor 28 is connected to ground to provide the required direct-current biasing potential as before described in reference to electron tube 13. Signal frequencies are shunted around cathode resistor 28 by capacitor 30 which prevents cathode degeneration in this stage.

An inductance coil 31 and a capacitor 32 form a parallel resonant load circuit connected between the positive terminal B+ of the source of direct-current energizing potential and the anode 40 of electron tube 25. The inductance coil 31 is illustrated as the primary winding of an intermediate frequency transformer 33 forming the output circuit of electron tube 25. Inductively coupled with the inductance coil 31 is the secondary winding 34 of the intermediate frequency transformer 33. A capacitor 35 is connected in shunt with the secondary winding 34 thereby forming a selective resonant circuit which may be the input circuit of a further intermediate frequency signal amplifier stage or the second detector stage of a superheterodyne receiving system.

A screen dropping resistor 36 connected between the screen grid 37 and the positive terminal B+ of the source of direct-current energizing potential provides the necessary energizing potential for the screen grid 37. Screen bypass capacitor 38 connected between the screen grid 37 and the cathode 29 of electron tube 25 provides a low impedance signal frequency path to maintain the screen grid 37 at substantially zero signal potential. The suppressor grid 39 of electron tube 25 may be connected directly to ground or may be connected to the cathode as shown which is a conventional practice.

Figure 2:
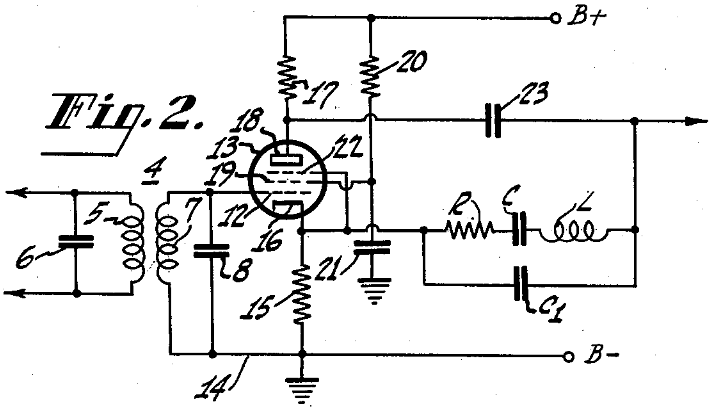
Figure 2 is a schematic circuit diagram of a portion of the amplifier illustrated in Figure 1 showing an equivalent electrical circuit for purposes of further illustrating the invention; and, Figure 3 is a graph showing curves showing the frequency response characteristic of the signal amplifier of Figure 1, as provided in accordance with the invention.

In Fig. 2 there is shown an amplifier stage which is an exact reproduction of the first intermediate frequency stage of Fig. 1 except that the equivalent electrical circuit of the crystal 26 has been illustrated in place of the crystal.

As is well known, as far as the electrical circuits associated with a crystal are concerned, the crystal can be replaced by an equivalent electrical network. This has been done in Figure 2 wherein the resistor R, the capacitor C and the inductor L respectively represent the equivalent resistance, the equivalent capacitance, and the equivalent inductance of the crystal. Capacitor $C_1$ in shunt with resistor R, capacitor C and inductor L represents the electrostatic capacity between the crystal holder electrodes.

The frequency at which mechanical resonance takes place, commonly referred to as the crystal resonant frequency, is the frequency at which capacitor C and inductor L form a series resonant circuit thereby exhibiting a low impedance at that frequency. An outstanding characteristic of a crystal is the high effective Q or $$\frac{L}{R}$$

ratio, which is readily available. A Q of 1000 or more is readily obtainable in crystals, whereas series resonant circuits comprising conventional inductors and capacitors exhibit a Q in the order of 100. The effect of the high Q circuit is to provide a selectivity characteristic having a high sharp peak and steep sides. Discrimination against undesirable adjacent signal frequencies is, therefore, increased as the Q of a circuit is increased.

It is, therefore, readily seen that if the feedback crystal is resonant at the intermediate frequency of the system, voltages of the intermediate frequency will be returned from the output circuit and applied to the cathode resistor 15 in such a phase as to compensate for the degeneration produced by cathode resistor 15 at that frequency. At frequencies other than the intermediate frequency the feedback crystal will exhibit a high impedance non-resonant circuit having primarily an inductive or a capacitive impedance depending on whether the frequency is above or below the intermediate frequency. Due to the extremely high Q of the crystal, the discrimination against frequencies other than the intermediate frequency will be very great. Therefore, little voltage other than voltages of the intermediate frequency will be applied to the cathode resistor to reduce the effect of degeneration. Consequently the gain of the intermediate frequency signal amplifier will be considerably increased at the intermediate frequency due to the effect of the feedback voltage to overcome the effect of degeneration.

The reduction in the gain of a signal amplifier stage due to cathode degeneration, as previously described, is represented by a factor equal to the normal gain of the signal amplifier stage divided by the sum of 1 plus the product of the transconductance of the electron tube and the resistance of the cathode resistor. It is, therefore, readily seen that an electron tube having a transconductance of 5000 microhms and a cathode resistor of 3000 ohms would have an effective gain with cathode degeneration equal to one sixteenth the effective gain without cathode degeneration. There has, therefore, been provided an effective squelch circuit to reduce the gain of the intermediate frequency amplifier to $\frac{1}{16}$ when the frequency of the received signal is not that of the intermediate frequency.

Figure 3:
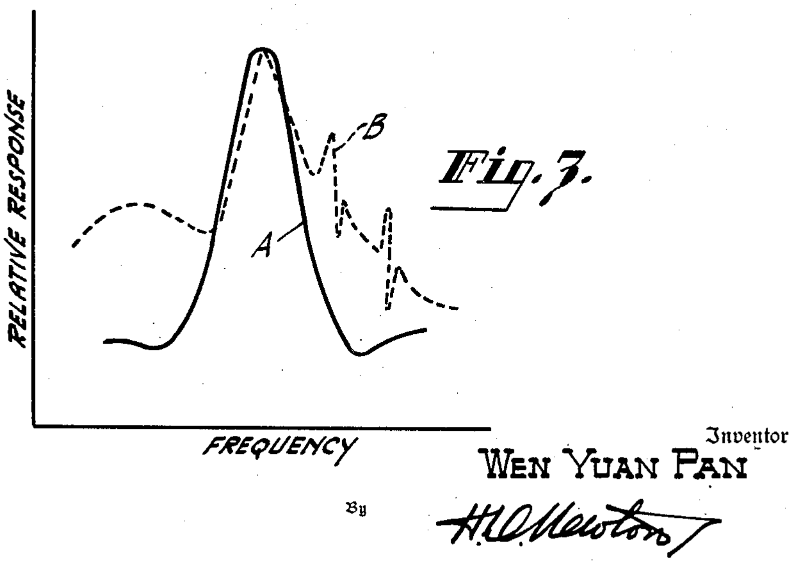

The magnitude and the phase of that portion of the output voltage, which is fed back to the cathode circuit, will be determined primarily by the relative values of the output resistor, the coupling capacitor, the plate-to-plate capacitance of the crystal device and the cathode resistor. It can be shown by a mathematical analysis of this circuit that as the frequency in the output circuit of the amplifier changes the relative phase of the feedback voltage changes. A proper phase relation between the feedback voltage and the cathode resistor signal voltage can be obtained at the intermediate frequency by providing equal resistor-capacitor time constants in the anode circuit and in the cathode circuit. If these time constants are made equal the solid curve A, shown in the graph in Figure 3, will be obtained. If the time constant determined by the anode load resistor and the coupling capacitor is made to be larger than the time constant provided by the cathode resistor and the crystal plate-to-plate capacitance, a non-symmetrical curve, such as the curve B of the graph of Figure 3, will be obtained. It is therefore readily seen that if the cathode time constant is made to be greater than the anode circuit time constant a non-symmetrical curve having a flat side on the low frequency side of the response characteristic will be produced. It is therefore desirable to utilize circuit parameters which will produce equal time constants in the anode and cathode circuits, which will therefore provide the symmetrical selectivity characteristic as shown by curve A of Figure 3. The discontinuities of curve B of Figure 3 are produced by the phase shift of the feedback voltage with a change in frequency as above described.

An intermediate frequency amplifier incorporating the invention has been tested and has been found to give substantially noise free operation when tuning the receiving system from signal to signal. This noise free operation is obtained as a result of the reduced gain of the system when the input signal to intermediate frequency amplifier is not equal to the intermediate frequency of the system. It was further found that the high Q of the crystal filter regenerative feedback circuit provided a selectivity characteristic having sufficiently steep sloping sides to discriminate against undesired adjacent channel signals.

There has thus been described a resistance-coupled amplifier having a symmetrical selectivity characteristic with steep sloping sides suitable for use with an intermediate frequency amplifier.

What is claimed is:

1. In a signal transmission system, the combination of an electron tube having a cathode, a control grid and an anode; a resonant input circuit and an unbypassed cathode resistor coupled in series arrangement between said control grid and said cathode; an output impedance coupled to said anode; an output capacitor connected to said anode; and a crystal forming an effective series-resonant circuit at the resonant frequency of said input circuit connected between said output capacitor and said cathode, whereby signal energy of a frequency equal to said input resonant circuit is fed back from said output circuit to compensate for the degenerative effect of said cathode impedance.

2. In a selective band-pass signal amplifier, the combination of an electron tube having a cathode, a plurality of grids including a control grid and an anode, an anode load resistor coupled to said anode, an output coupling capacitor connected to said anode, a cathode resistor connected between said cathode and a point of fixed reference potential, a resonant input circuit connected between said control grid and said point of fixed reference potential, circuit means connected to said other grids for maintaining said grids at a predetermined direct current potential, a frequency selective piezoelectric device connected between said output coupling capacitor and said cathode and having an inherent plate to plate capacitance, said piezoelectric device constituting a high Q series resonant circuit at the resonant frequency of said input circuit, and the resistor-capacitor time constant of said load resistor and said output coupling capacitor being substantially equal to the resistor-capacitor time constant of said cathode resistor and said inherent capacitance of said piezoelectric device, whereby the selectivity characteristic of said selective band-pass amplifier is maintained substantially symmetrical.

3. In an intermediate frequency signal amplifier, the combination of an electron tube having a cathode, a control grid and an anode, a resistor capacitor output network coupled to said anode, a cathode resistor connected between said cathode and a point of fixed reference potential, a fixed resonant input circuit coupled between said grid and said point of fixed reference potential, whereby intermediate frequency signal voltages are applied between said grid and said cathode, a regenerative feedback means comprising a piezoelectric device having a resonant frequency substantially equal to the intermediate frequency connected between said output capacitor and said cathode, whereby output signal voltage of the intermediate frequency is fed back to the input circuit to increase the gain of said signal amplifier at the intermediate frequency, said piezoelectric device having an inherent shunt capacity, and said output circuit having a time constant substantially equal to the time constant of said cathode resistor and said inherent capacity, whereby a substantially symmetrical selectivity characteristic for said intermediate frequency amplifier is obtained.

References Cited in the file of this patent

UNITED STATES PATENTS

| Number | Name | Date |
|---|---|---|
| 1,853,178 | Roberts | Apr. 12, 1932 |
| 1,967,570 | Dalpayrat | July 24, 1934 |
| 2,064,991 | Round et al. | Dec. 22, 1936 |
| 2,068,112 | Rust | Jan. 19, 1937 |
| 2,162,470 | Kautter | June 13, 1939 |
| 2,162,878 | Brailsford | June 20, 1939 |
| 2,268,672 | Plebanski | Jan. 6, 1942 |
| 2,452,951 | Norgaard | Nov. 2, 1948 |
| 2,510,868 | Day | June 6, 1950 |

OTHER REFERENCES

Seeley and Kimball: "Analysis and Design of Video Amplifiers," R. C. A. Review, January 19, 1939. Vol. III, No. 3, pp. 291–308.

"Radio Engineering," Terman, 3d ed., pp. 762–763. Pub. 1947 by McGraw-Hill Book Co., N. Y. (Copy in Div. 69.)